US010607566B2

(12) United States Patent
Nagashima et al.

(10) Patent No.: US 10,607,566 B2
(45) Date of Patent: *Mar. 31, 2020

(54) METHOD, COMPUTER PROGRAM, AND SYSTEM FOR MEASURING DISPLAY LIGHT INTENSITY OF A DISPLAY DEVICE

(71) Applicant: EIZO Corporation, Ishikawa (JP)

(72) Inventors: Kensuke Nagashima, Ishikawa (JP);
Takafumi Kawakami, Ishikawa (JP);
Atsuyoshi Deyama, Ishikawa (JP);
Junro Yonemitsu, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,265

(22) Filed: Apr. 22, 2019

(65) Prior Publication Data

US 2019/0244585 A1 Aug. 8, 2019

Related U.S. Application Data

(63) Continuation of application No. 14/344,703, filed as application No. PCT/JP2012/070299 on Aug. 9, 2012, now Pat. No. 10,311,828.

(30) Foreign Application Priority Data

Sep. 15, 2011 (JP) ................................ 2011-202101

(51) Int. Cl.
*G09G 5/04* (2006.01)
*G01J 3/50* (2006.01)
(Continued)

(52) U.S. Cl.
CPC .................. *G09G 5/04* (2013.01); *G01J 1/42* (2013.01); *G01J 3/0264* (2013.01); *G01J 3/506* (2013.01);
(Continued)

(58) Field of Classification Search
CPC .. G01J 1/42; G01J 3/0264; G01J 3/506; G01J 3/52; G09G 5/02; G09G 5/04;
(Continued)

(56) References Cited

U.S. PATENT DOCUMENTS 6,504,950 B1 1/2003 Murashita et al.
2002/0198963 A1 12/2002 Wu et al.
(Continued)

FOREIGN PATENT DOCUMENTS

CN 1482592 A 3/2004
CN 1928643 A 3/2007
(Continued)

OTHER PUBLICATIONS

International Search Report dated Nov. 13, 2012 in PCT/JP2012/070299.
(Continued)

*Primary Examiner* — Yaron Cohen
(74) *Attorney, Agent, or Firm* — Maier & Maier, PLLC

(57) ABSTRACT

A display light measurement method which can measure color representation of a various types of display devices regardless of the specification of the display device; a computer program, and a measurement system. A measurement device connected to an optical sensor can communicate with a target display device (information terminal) to be measured. The measurement device transmits content including a color patch to the display device to cause the display device to display the content and performs a measurement on the displayed content using the optical sensor. To perform measurements on many color patches, the measurement device repeats the following: when a measurement on one color patch being displayed is complete, the measurement device transmits content including another color patch to the display device to cause the display device to (Continued)

display the content and performs a measurement on the content being displayed.

9 Claims, 12 Drawing Sheets

(51) Int. Cl.
    *G01J 3/52*     (2006.01)
    *G01J 3/02*     (2006.01)
    *G01J 1/42*     (2006.01)
    *G09G 5/02*     (2006.01)

(52) U.S. Cl.
    CPC ............... *G01J 3/52* (2013.01); *G09G 5/02* (2013.01); *G09G 2320/0666* (2013.01); *G09G 2320/0693* (2013.01); *G09G 2340/06* (2013.01)

(58) Field of Classification Search
    CPC ... G09G 2320/0666; G09G 2320/0693; G09G 2340/06
    See application file for complete search history.

(56) References Cited

U.S. PATENT DOCUMENTS

| | | |
|---|---|---|
| 2003/0053001 A1 | 3/2003 | Murashita et al. |
| 2006/0280360 A1 | 12/2006 | Holub |
| 2011/0012933 A1 | 1/2011 | Weng |
| 2012/0229526 A1* | 9/2012 | Holmes .................... G06F 3/14 |
| | | 345/690 |
| 2013/0027418 A1 | 1/2013 | Tryndin et al. |

FOREIGN PATENT DOCUMENTS

| | | |
|---|---|---|
| JP | 10-049092 | 2/1998 |
| JP | 11-338443 A | 12/1999 |
| JP | 2010-250060 | 11/2010 |
| WO | 2010/119588 A1 | 10/2010 |

OTHER PUBLICATIONS

EP Office Action dated Jan. 27, 2015 in connection with EP Application No. 12831533.0.
Chinese Official Action dated Feb. 28, 2015 in connection with Chinese Patent Application No. 201280044578.6.

* cited by examiner

```
<!DOCTYPE HTML PUBLIC "-//W3C//DTD HTML 4.01 Transitional//EN"
"http://www.w3.org/TR/html4/loose.dtd">
<HTML>
    <!-- HTTP for Device Emulation -->
    <HEAD>
        <META http-equiv="Content-Type" content="text/html; charset=utf-8" />
        <META http-equiv="Refresh" content="3; URL="http://**.**.****.****/Patch(255.000.000).html"">
        <TITLE>HTTP for Device Emulation</TITLE>
    </HEAD>
    <BODY bgcolor="#ff0000" text="#ffffff">
        <H1>RGB=(255,0,0)</H1>
    </BODY>
</HTML>
```

Fig. 7

```
<!DOCTYPE HTML PUBLIC "-//W3C//DTD HTML 4.01 Transitional//EN"
"http://www.w3.org/TR/html4/loose.dtd">
<HTML>
        <!-- HTTP for Device Emulation -->
        <HEAD>
                <META http-equiv="Content-Type" content="text/html;
charset=utf-8" />
                <META http-equiv="Refresh" content="5; >
                <TITLE>HTTP for Device Emulation</TITLE>
        </HEAD>
        <BODY bgcolor="#ff0000" text="#ffffff">
                <H1>RGB=(255,0,0)</H1>
        </BODY>
</HTML>
```

```
<!DOCTYPE HTML PUBLIC "-//W3C//DTD HTML 4.01 Transitional//EN"
"http://www.w3.org/TR/html4/loose.dtd">
<HTML>
        <!-- HTTP for Device Emulation -->
        <HEAD>
                <META http-equiv="Content-Type" content="text/html;
charset=utf-8" />
                <META http-equiv="Refresh" content="5; >
                <TITLE>HTTP for Device Emulation</TITLE>
        </HEAD>
        <BODY bgcolor="#00ff00" text="#ffffff">
                <H1>RGB=(0,255,0)</H1>
        </BODY>
</HTML>
```

Fig. 8

METHOD, COMPUTER PROGRAM, AND SYSTEM FOR MEASURING DISPLAY LIGHT INTENSITY OF A DISPLAY DEVICE

CROSS-REFERENCE TO RELATED APPLICATIONS

This application is a continuation of U.S. patent application Ser. No. 14/344,703, filed on Mar. 13, 2014, which is a national phase of International application No. PCT/JP2012/070299, filed on Aug. 9, 2012, which claims priority to Japanese application No. 2011-202101, filed on Sep. 15, 2011. The entire contents of U.S. patent application Ser. No. 14/344,703 are incorporated herein by reference.

TECHNICAL FIELD

The technology disclosed below relates to color management of display devices. In particular, the technology relates to a display light intensity measurement method which can be widely used to manage display colors on various types of display devices each including a display unit; a computer program; and a measurement system.

BACKGROUND ART

Color representation of a display device including a liquid crystal display (LCD) or the like is based on additive color mixture, whereas color representation of a paper medium is based on subtractive color mixture. The color representation of the same color image varies between when the color image is outputted from a printing device such as a printer and when the color image is outputted on a display device. Accordingly, the output result from the printing device and the color representation which can be identified on the display device are not matched, and the user may not be able to obtain the desired result.

Further, due to characteristics specific to components included in each display device, color representation varies among display devices. Even the same display device represents colors differently depending on the setting of luminance or tone. Accordingly, there are cases where even when the same image is outputted, colors can be represented as desired by the user on one display device, whereas colors may look differently on another display device. For this reason, a color management technology for setting the display colors to the desired color representation in accordance with the settings or characteristics of each display device or unifying color representation among multiple display devices is important for the printing and design industries.

Examples of traditional color management methods include a method by which an image for adjustment is displayed on the target display device and then the user looks at the displayed image and subjectively sets color space (Patent Document 1). However, this method, in which the user manually and subjectively sets color space, increases the error resulting from the ambient environment, time, or physical condition, thereby making it difficult to unify color representation. Further, the manual work is very complicated.

Another method is to automatically set color space using an existing ICC (International Color Consortium) profile, which is created for various types of display devices. However, even if the ICC profile can absorb characteristics specific to the type of the display device, unification of color representation would be insufficient unless the ICC profile adapts to characteristics specific to each display device, as described above.

For this reason, a method of attaching an optical sensor to the display device and then executing calibration software on a personal computer (hereafter referred to as PC) connected to the display device is being used. In this method, the user specifies a target adjustment value for the display device, and the PC performs calibration so that the measured value matches the specified target adjustment value. The optical sensor is attached to the liquid crystal panel of the display device, and calibration is automatically performed without the user having to do manual work (Patent Document 2).

PRIOR ART DOCUMENTS

Patent Literature

Patent Document 1: Japanese Unexamined Patent Application Publication No. 10-49092
Patent Document 2: Japanese Unexamined Patent Application Publication No. 2010-250060

SUMMARY OF THE INVENTION

Problems to be Solved by the Invention

Traditionally, a monitor function or photo viewer function for desktop publishing (DTP) is achieved by display devices which are connected to a PC through a video input/output terminal, Universal Serial Bus (USB) terminal, or the like. Color management, as described above, can be performed by causing the PC to run a calibration software program and then to control both the optical sensor connected to the display device and the display on the display device.

Recently, tablet information terminals have been used widely and tended to serve as sufficiently large and high-definition display devices. In the printing and publishing industries and the design industry also, users have more often checked images using tablet information terminals as display devices, specifically, as monitors or photo viewers for DTP, or e-book readers. The user can wirelessly directly transmit image data from a tablet information terminal to a printing device so that the printing device outputs the image data. Accordingly, the management of color representation of tablet information terminals is increasing its importance.

Some types of tablet information terminals have an operation or output function and a calculation function and no video input/output terminal. For tablet information terminals having no video input/output terminal, it is not possible to control both the optical sensor and the display on the screen. Accordingly, the traditional method for automatically calibrating a display device is not applicable to such tablet information terminals. There may be used a method by which the user manually displays each image for measurement on a tablet information terminal and then measures the image using a PC running calibration software. However, the work of manually displaying several thousand or several tens of thousands images for measurement is an extremely heavy load for the user.

There has been proposed a calibration system which is dedicated to tablet information terminals having no video input/output terminal. This system automatically calibrates the target tablet information terminal by running calibration software on the terminal itself and controlling an optical sensor using a separate PC. Thus, it is possible to manage colors on the tablet information terminal having no video input/output terminal. However, this software is dedicated to the particular type of tablet information terminal. Since there are various types of tablet information terminals, it is difficult to prepare calibration software for all types of tablet information terminals.

The present invention has been made in view of the foregoing, and an object thereof is to provide a display light intensity measurement method which can measure color representation of a wide variety of display devices regardless of the specification of the display device, such as the presence or absence of a video input/output terminal; a computer program for causing a computer to perform the measurement method, and a measurement system.

Means for Solving the Problems

The present invention provides a method by which a measurement device connected to an optical sensor and configured to measure display light intensity of a display device causes the display device to sequentially display a plurality of different images for adjustment and measures, at a predetermined timing, light intensity of the display device displaying each image for adjustment using the optical sensor, the method comprising:

a step of transmitting, by the measurement device, content comprising an image for adjustment, and display control information for controlling the timing when the display device displays the content, to the display device; and a changing step of changing, by the measurement device, content to be transmitted, on the basis of the display control information in accordance with the timing when the optical sensor performs a measurement.

In the method of the present invention, the measurement device transmits, as the display control information, information identifying the image for adjustment included in the content transmitted along with the display control information.

In the method of the present invention, the measurement device transmits, as the display control information, information instructing the display device to intermittently transmit a content request to the measurement device and to display the received content, and the changing step comprises: a step of detecting that a measurement on one image for adjustment being displayed is complete; and after the detecting step, a step of changing content comprising the one image for adjustment to content comprising another image for adjustment in response to a content request from the display device.

In the method of the present invention, the measurement device transmits, as the display control information, a time during which content is displayed or a time during which the display device waits before transmitting a next content request.

In the method of the present invention, the measurement device transmits, as the display control information, information identifying content to be requested next.

The present invention provides a method by which a measurement device connected to an optical sensor and configured to measure display light intensity of a display device transmits or receives information to or from an information processing device, causes the display device to sequentially display a plurality of different images for adjustment, and measures, at a predetermined timing, light intensity of the display device displaying each image for adjustment using the optical sensor, the method comprising:

a step of instructing, by the measurement device, the information processing device to transmit, to the display device, content comprising an image for adjustment, and display control information for controlling the timing when the content is displayed on the display device; and a changing step of causing, by the measurement device, the information processing device to change content to be transmitted, on the basis of the display control information in accordance with the timing when the optical sensor performs a measurement.

In the method of the present invention, the information processing device transmits, as the display control information, information identifying the image for adjustment included in the content transmitted along with the display control information.

In the method of the present invention, the information processing device transmits, as the display control information, information instructing the display device to intermittently transmit a content request to the information processing device and to display the received content, and the changing step comprises: a step of detecting that a measurement on one image for adjustment being displayed is complete; and after the detecting step, a step of causing the information processing device to change content comprising the one image for adjustment to content comprising another image for adjustment in response to a content request from the display device.

In the method of the present invention, the information processing device transmits, as the display control information, a time during which content is displayed or a time during which the display device waits before transmitting a next content request.

In the method of the present invention, the information processing device transmits, as the display control information, information identifying content to be requested next.

The method of the present invention further comprises a step of storing, by the measurement device, information identifying an image for adjustment included in transmitted content and a result of a measurement performed on the image for adjustment included in the content being displayed in such a manner that the information and the result are associated with each other.

The method of the present invention further comprises a step of generating, by the measurement device, color space information related to conversion of color space of the display device on the basis of a measurement result.

The present invention provides a computer program for causing a computer connected to an optical sensor to cause a display device to sequentially display a plurality of images for adjustment and for causing the computer to measure light intensity of the display device displaying each image for adjustment using the optical sensor, the computer program causing a computer to perform:

a step of transmitting, to the display device, content comprising an image for adjustment, and display control information for controlling the timing when the content is displayed on the display device; and a step of changing content to be transmitted, on the basis of the display control information in accordance with the timing when the optical sensor performs a measurement.

The present invention provides a computer program for causing a computer connected to an optical sensor to cause a display device to sequentially display a plurality of images for adjustment and for causing the computer to measure light intensity of the display device displaying each image for adjustment using the optical sensor, the computer program causing a computer to perform:

a step of instructing another computer to transmit, to the display device, content comprising an image for adjustment, and display control information for controlling the timing when the content is displayed on the display device; and a step of instructing the other computer to change content to be transmitted, on the basis of the display control information in accordance with the timing when the optical sensor performs a measurement.

The present invention provides a measurement system comprising:

a display device; and a display light intensity measurement device configured to cause the display device to sequentially display a plurality of images for adjustment, the measurement device comprising means connected to an optical sensor configured to measure, at a predetermined timing, light intensity of the display device displaying each image for adjustment, wherein the measurement device comprises:

means configured to transmit, to the display device, content comprising each image for adjustment, and display control information for controlling the timing when the content is displayed on the display device; and means configured to change content to be transmitted, on the basis of the display control information in accordance with the timing when the optical sensor performs a measurement, and the display device comprises:

means configured to receive the content and the display control information transmitted by the measurement device; and means configured to display the received content on the basis of the received display control information.

The present invention provides a measurement system comprising:

a display device;

a display light intensity measurement device configured to cause the display device to sequentially display a plurality of images for adjustment, the measurement device comprising means connected to an optical sensor configured to measure, at a predetermined timing, light intensity of the display device displaying each image for adjustment; and an information processing device configured to communicate with the measurement device and the display device, wherein the measurement device comprises:

means configured to instruct the information processing device to transmit, to the display device, content comprising each image for adjustment, and display control information for controlling the timing when the content is displayed on the display device; and means configured to instruct the information processing device to change content to be transmitted, on the basis of the display control information in accordance with the timing when the optical sensor performs a measurement, and the display device comprises:

means configured to receive the content and the display control information transmitted by the information processing device; and means configured to display the received content on the basis of the received display control information.

In the measurement method, the computer program, and the measurement system, multiple adjustment images for measurement serving as content are transmitted to the display device through communication. Also transmitted to the display device is display control information for matching the timing when the content including the adjustment image for measurement is displayed with the timing when the optical sensor performs a measurement. Thus, the measurement device controls the optical sensor so that the optical sensor sequentially measures the images for adjustment, as well as changes the contents of the transmitted content or changes the content itself in accordance with the timing when the optical sensor performs a measurement.

Each image for adjustment is an image having achromatic color of different luminance or an image having multiple chromatic colors. Examples of an image for adjustment include an image displayed by specifying a background color.

The content may be an HTML (HyperText Markup Language) file, or a document file such as Adobe Flash® (a product of Adobe Systems). The communication protocol is, for example, HTTP (HyperText Transfer Protocol) but not limited thereto. The content and the display control information may be directly transmitted from the measurement device to the display device or may be transmitted through another information processing device to the display device.

Since the display control information includes information identifying the image for adjustment included in the content, which is transmitted along with the display control information, the measurement device can identify the image for adjustment which is supposed to be being displayed on the display device at each point in time. Thus, the measurement device can control the timing when the display light intensity is measured.

The display control information includes information instructing the display device to intermittently transmit a content request to the measurement device. Only after a measurement on the image for adjustment which is supposed to be being displayed on the display device at each point in time is complete, the measurement device changes the image for adjustment to another and transmits content in response to a content request which is intermittently transmitted from the display device. Thus, the measurement device can control details of the image for adjustment displayed on the display device.

Note that the display control information includes information specifying the interval at which a content request is transmitted. By making the transmission interval shorter than the measurement time required for the optical sensor to measure one image for adjustment, it is possible to reduce the time required to measure multiple images for adjustment. In contrast, by making the transmission interval longer than the time required for measurement, it is possible to suppress flicker or the like which may occur on the screen when display of the image for adjustment is refreshed.

The display control information includes information specifying the display time during which the content is displayed or information specifying the waiting time during which the display device waits before transmitting a content request in order to change the current image for adjustment to another. Note that the display time may be specified using an absolute time. Both the display time and the waiting time are substantially the time during which the image for adjustment included in the content received by the display device is supposed to be being displayed. If the measurement device can specify such time, it can match the timing of display with the timing of measurement.

The display control information includes information specifying content to be requested next. The content transmitted by the measurement device may have the same name even when the image for adjustment is changed or may vary among images for adjustment. If the content varies, the measurement device can control switching of the displayed content using the display control information and thus control details of the image for adjustment displayed on the display device.

The information identifying the transmitted content, that is, the information identifying the image for adjustment which is supposed to be being displayed on the display device and the corresponding measurement result are stored as associated with each other. Thus, the measurement device can generate information on an ICC profile or the like for performing color management on the basis of the measurement results.

Color space information may be further generated based on the measurement results. Color space information refers to information on the color space of an individual device such as a display device and is, for example, an ICC profile conforming to the ICC standard or information conforming to a standard such as WCS (Windows® Color System). The measurement device can automatically obtain even color space information. For example, if the color space information is 3D-LUT, precise color management can be performed.

Further, by using the results of measurements on the multiple different display devices, the measurement device may generate pieces of color space information corresponding to some or all of the measured display devices. Thus, it is possible to generate not only color space information corresponding to each display device but also average color space information which applies to a somewhat uniform group, such as the same type or same lot.

Effect of the Invention

According to the measurement method disclosed, an image for adjustment is received by the display device through communication and displayed thereon, and switching of the displayed image for adjustment to another is controlled on the basis of the display control information from the measurement device. Thus, the timing when the optical sensor performs a measurement and the timing when the display device displays an image for adjustment are matched. This eliminates the necessity for the target display device to include a video input/output terminal and allows measurement of color representation of various types of devices.

BRIEF DESCRIPTION OF THE DRAWINGS

FIG. 7 is a drawing showing one example of display control information of the first embodiment.

FIG. 8 is a drawing showing another example of display control information of the first embodiment.

EMBODIMENTS

Hereafter, some embodiments of the present invention will be described specifically with reference to the drawings.

First Embodiment

Figure 1:
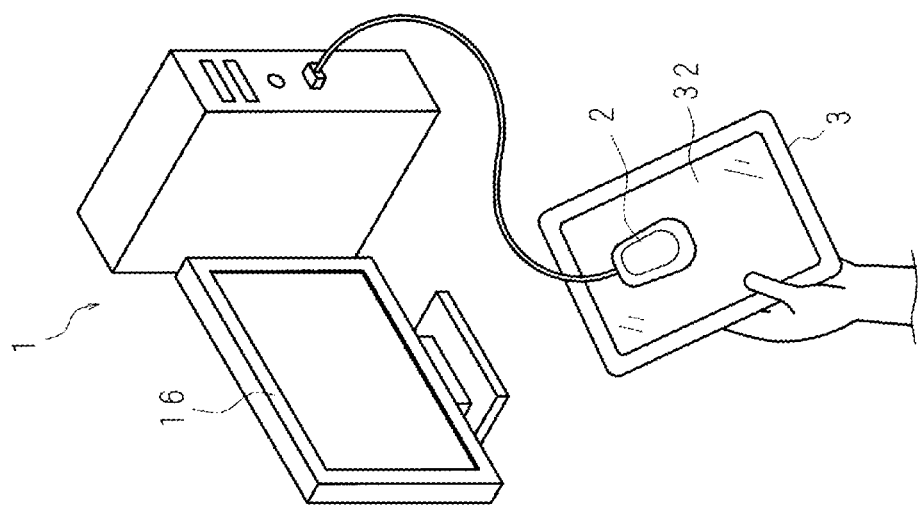
FIG. 1 is a conceptual diagram schematically showing an aspect where a measurement device of a first embodiment is being used.

FIG. 1 is a conceptual diagram schematically showing an aspect where a measurement device 1 of a first embodiment is being used. The measurement device 1 is, for example, a desktop PC. The user attaches an optical sensor 2 connected to the measurement device 1 to a display unit 32 of an information terminal 3 (display device) which is the subject of color management, via a USB (Universal Serial Bus). The user then causes the display unit 32 to display multiple color control patches (images for adjustment; hereafter referred to as color patches) so that the measurement device 1 performs measurements on the color patches. The color patches include a gray image. As described below, the measurement device 1 controls the display of the color patches on the display unit 32 of the information terminal 3 through communication. Accordingly, even the information terminal 3 having no video input/output terminals can automatically measure the display light intensity of the display unit 32 of the information terminal 3 using the color patches. As used herein, the display light intensity refers to intensity obtained by representing colors quantitatively and is, for example, tristimulus values XYZ in the CIE 1931 colorimetric system. The display light intensity may be other color representation forms such as L*, a*, and b* in the CIELAB color space.

In the first embodiment, the target information terminal 3 to be measured is, for example, an iPad® (trade name) or a tablet PC including an operating system (OS) such as Android® or BlackBerry® and has no video input/output terminal. The information terminal 3 may be a mobile phone, a portable communication device such as a game machine, or a television having a communication function. That is, the target device to be measured by the measurement device 1 only has to be capable of communicating with the measurement device 1, regardless of whether the device includes a video input/output terminal. For example, the target device may be a monitor for a desktop PC having a video input/output terminal, that is, a display device which is connected to the PC. In this case, the measurement device 1 communicates with the PC to cause the display device to display the color patches. The target device may be an e-book reader or the like having no communication function and having USB interfaces. Such an e-book reader can be measured by connecting a PC to the e-book reader to provide the e-book reader with a communication function and then displaying the user interface (UI) of a WEB browser on the e-book reader from the PC.

Figure 2:
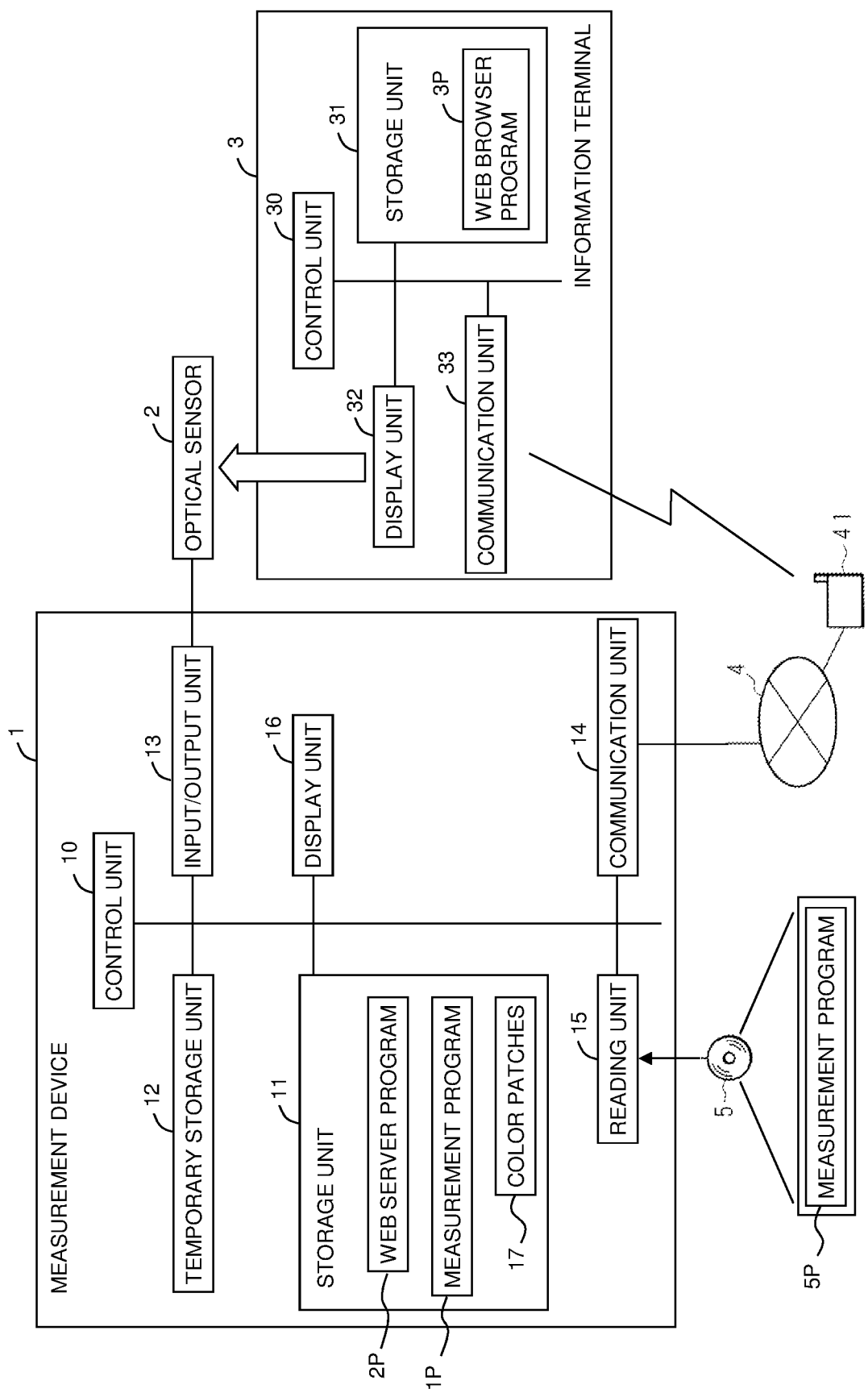
FIG. 2 is a block diagram showing the configuration of a measurement system of the first embodiment.

Hereafter, there will be described a measurement system which measures the display light intensity of the display unit 32 of the information terminal 3 using the measurement device 1. FIG. 2 is a block diagram showing the configuration of a measurement system of the first embodiment. The measurement system includes the measurement device 1, the optical sensor 2, and the target information terminal 3.

The measurement device 1 is, for example, a PC and includes a control unit 10, a storage unit 11, a temporary storage unit 12, an input/output unit 13, a communication unit 14, a reading unit 15, and a display unit 16. While the measurement device 1 includes (or is connected to) the display unit 16 in the first embodiment, the display unit 16 is not needed in performing a measurement.

The control unit 10 controls the respective units using a central processing unit (CPU). The control unit 10 loads a measurement program 1P and a Web server program 2P stored in the storage unit 11 into the temporary storage unit 12 and then executes these programs. Thus, the PC functions as the measurement device 1.

The storage unit 11 is, for example, a hard disk and may be various types of non-volatile memories, such as a solid state drive (SSD). The storage unit 11 stores the measurement program 1P and the Web server program 2P, as well as color patches 17. The storage unit 11 may previously store Web content which is to be transmitted to the information terminal 3 when the PC serves as a Web server. The storage unit 11 also stores information that the control unit 10 uses when performing a calculation and information based on the measurement results, such as an ICC profile. The latter information will be subjected to a calculation and outputted. Note that the image 29 may be included in the measurement program 1P.

The temporary storage unit 12 is, for example, a random access memory (RAM) such as a static random access memory (SRAM) or dynamic random access memory (DRAM). The temporary storage unit 12 temporarily stores information which occurs when the control unit 10 performs an operation, for example, measurement information which is inputted from the optical sensor 2.

The input/output unit 13 is, for example, a Universal Serial Bus (USB) interface. The input/output unit 13 is connected to the optical sensor 2. It transmits a control signal outputted by the control unit 10 to the optical sensor 2, as well as receives a signal outputted by the optical sensor 2 and transmits it to the control unit 10. Of course, the input/output unit 13 is not limited to a USB interface.

The communication unit 14 is connected to a network 4 and transmits or receives information through the network 4 in accordance with a predetermined communication protocol. While communication is performed in accordance with the HTTP in the first embodiment, the communication protocol is not limited thereto. The control unit 10 transmits Web content to the information terminal 3 through the communication unit 14.

The reading unit 15 is, for example, a disk drive. The reading unit 15 reads information stored in a storage medium 5, such as a compact disc (CD), digital versatile disc (DVD), Blu-Ray® disc (BD), flash memory, or flexible disc. The storage medium 5 stores a measurement program 5P. The control unit 10 reads information recorded in the storage medium 5 using the reading unit 15 and then stores the information in the storage unit 11 or temporary storage unit 12. The measurement program 1P stored in the storage unit 11 may be a copy of the measurement program 5P read from the storage medium 5.

The display unit 16 is, for example, a display device including a liquid crystal panel. The control unit 10 displays, on the display unit 16, the course of a process or information obtained as the result of a process.

The optical sensor 2 is, for example, a colorimetric sensor and is connected to the measurement device 1 through a USB interface thereof. The measurement device 1 can output a measurement start control signal to the optical sensor 2 or receive a measurement result signal from the optical sensor 2 through the input/output unit 13.

The target information terminal 3 includes a control unit 30, a storage unit 31, a display unit 32, and a communication unit 33.

The control unit 30 is, for example, a CPU and controls the storage unit 31, the display unit 32, and the communication unit 33 to cause these units to operate as a PC. In response to an operation of the operator, the control unit 30 reads and executes a Web browser program 3P stored in the storage unit 31, thereby performing a Web browser function.

The storage unit 31 is, for example, an SSD and may be a hard disk. The storage unit 31 stores various programs and information referred to by the control unit 30, as well as the Web browser program 3P.

The display unit 32 is, for example, a liquid-crystal touchscreen display and may be an organic electroluminescence (EL) display. The control unit 30 displays the user interface (UI) of the Web browser on the display unit 32.

The communication unit 33 is, for example, a wireless LAN interface. The communication unit 33 is connected to the network 4 through an access point 41 and transmits or receives information to or from the measurement device 1 in accordance with the predetermined communication protocol (HTTP).

The network 4 is, for example, an LAN and may be a network connected to a communication network such as the Internet. The access point 41 allows the information terminal 3 to wirelessly access the network 4.

Figure 3:
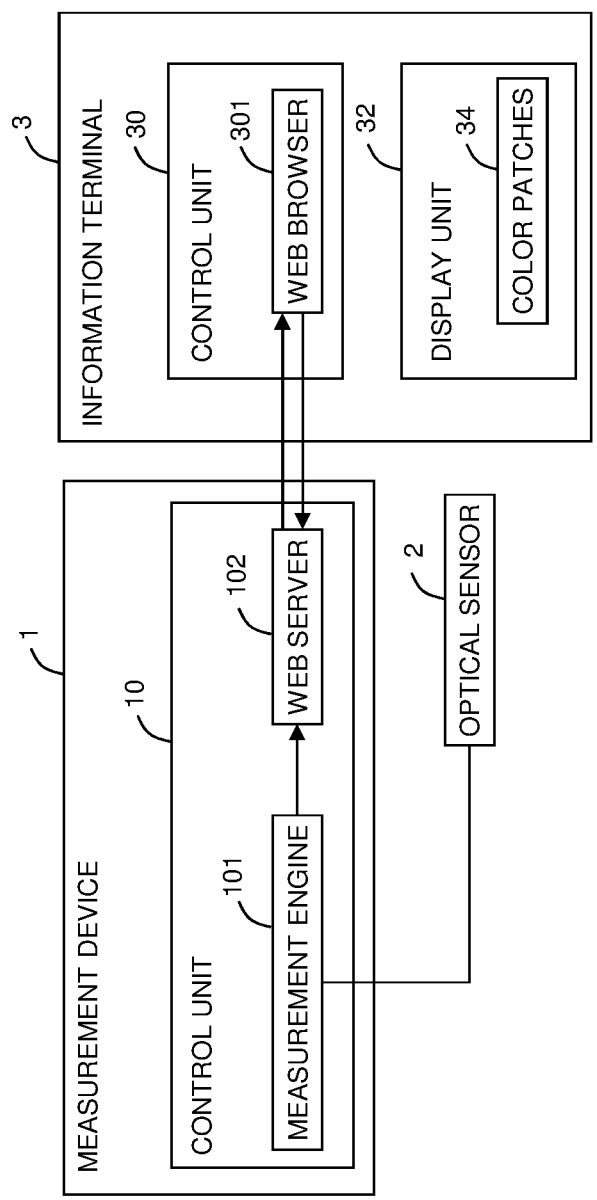
FIG. 3 is a function block diagram schematically showing functions of the measurement system of the first embodiment.

FIG. 3 is a function block diagram schematically showing functions of the measurement system of the first embodiment. The measurement system has main functions: a measurement engine 101 obtained when the control unit 10 of the measurement device 1 executes the measurement program 1P; a Web server 102 obtained when the control unit 10 executes the Web server program 2P; and a Web browser 301 obtained when the control unit 30 of the information terminal 3 executes the Web browser program 3P.

By using the functions of the measurement engine 101, the control unit 10 of the measurement device 1 controls input/output of a signal between the measurement device 1 and the optical sensor 2, as well as controls the timing when the information terminal 3 displays a color patch. Also, by using the functions of the Web server 102, the control unit 10 communicates with the information terminal 3 in accordance with an instruction from the measurement engine 101 to perform processes such as generation of Web content and transmission of the Web content to the information terminal 3. Specifically, the Web server 102 creates Web content in accordance with HTTP 4.0. While the functions of the Web server 102 are independent of the measurement engine 101 in the first embodiment, the functions may serve as part of the measurement engine 101.

The control unit 30 of the information terminal 3 communicates with the measurement device 1 using the functions of the Web browser 301. Also, by using the functions of the Web browser 301, the control unit 30 displays a color patch 34 on the display unit 32 on the basis of the Web content received from the measurement device 1.

Figure 4:
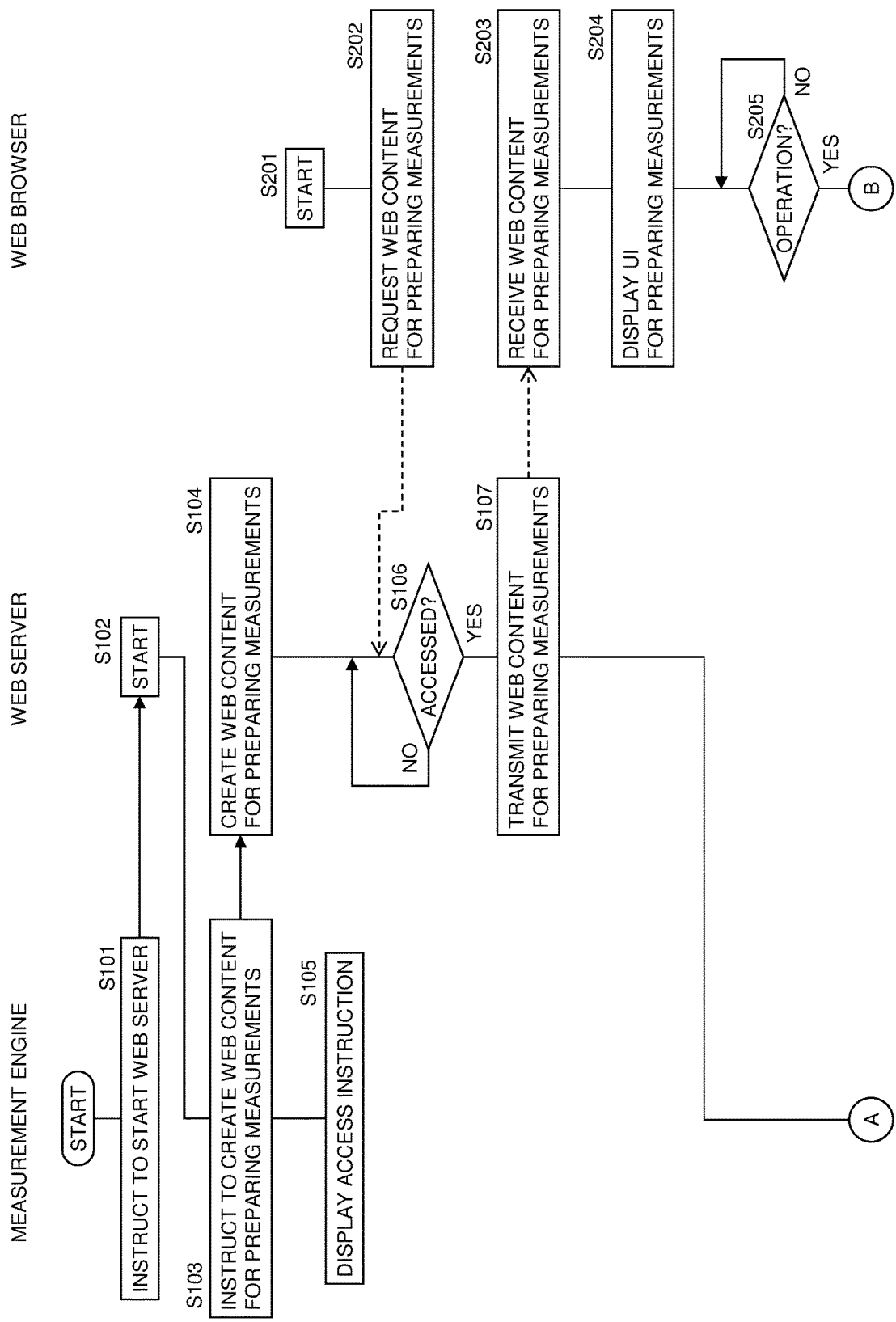
FIG. 4 is a flowchart showing one example of process steps performed by the measurement system of the first embodiment.
Figure 5:
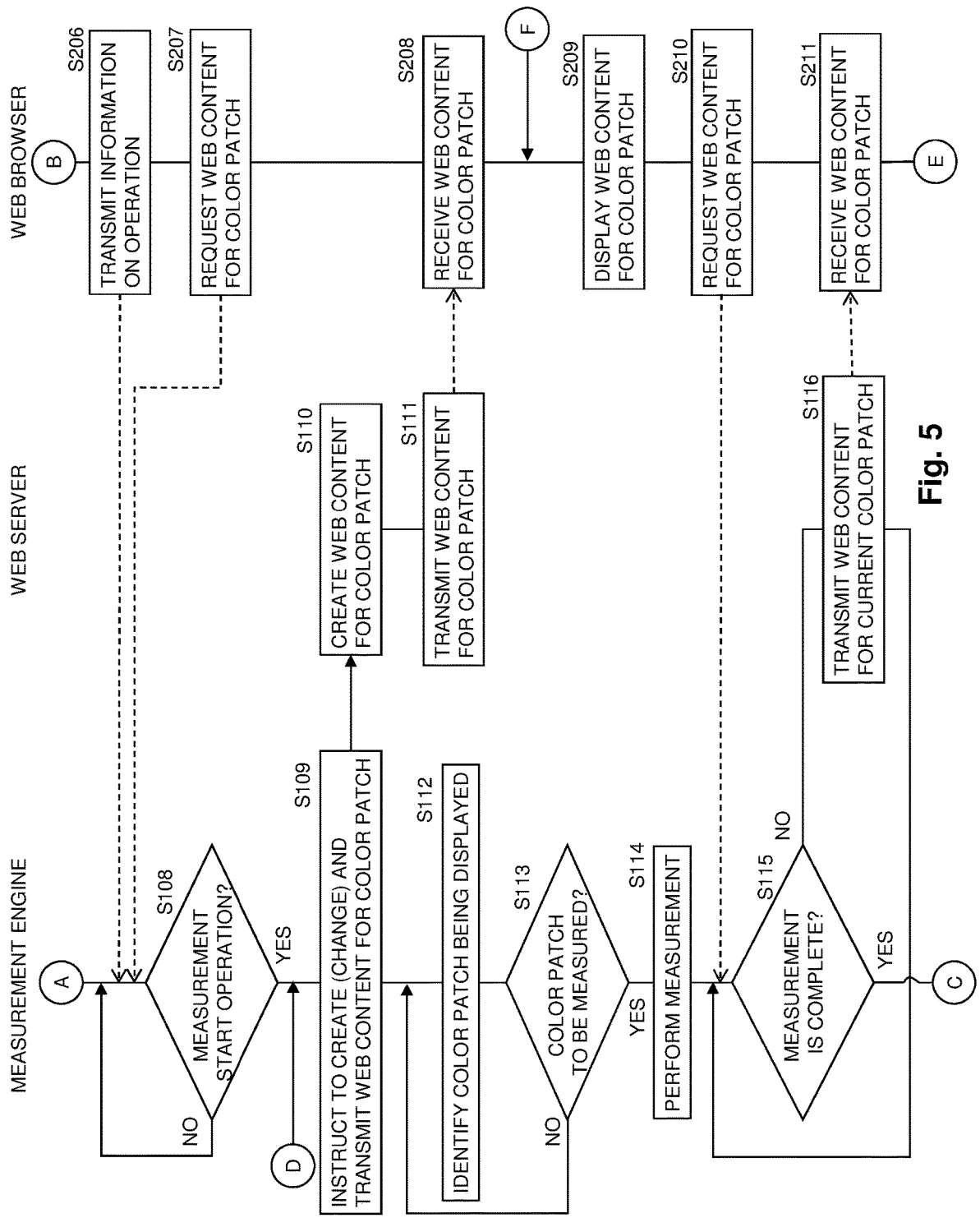
FIG. 5 is a flowchart showing one example of process steps performed by the measurement system of the first embodiment.
Figure 6:
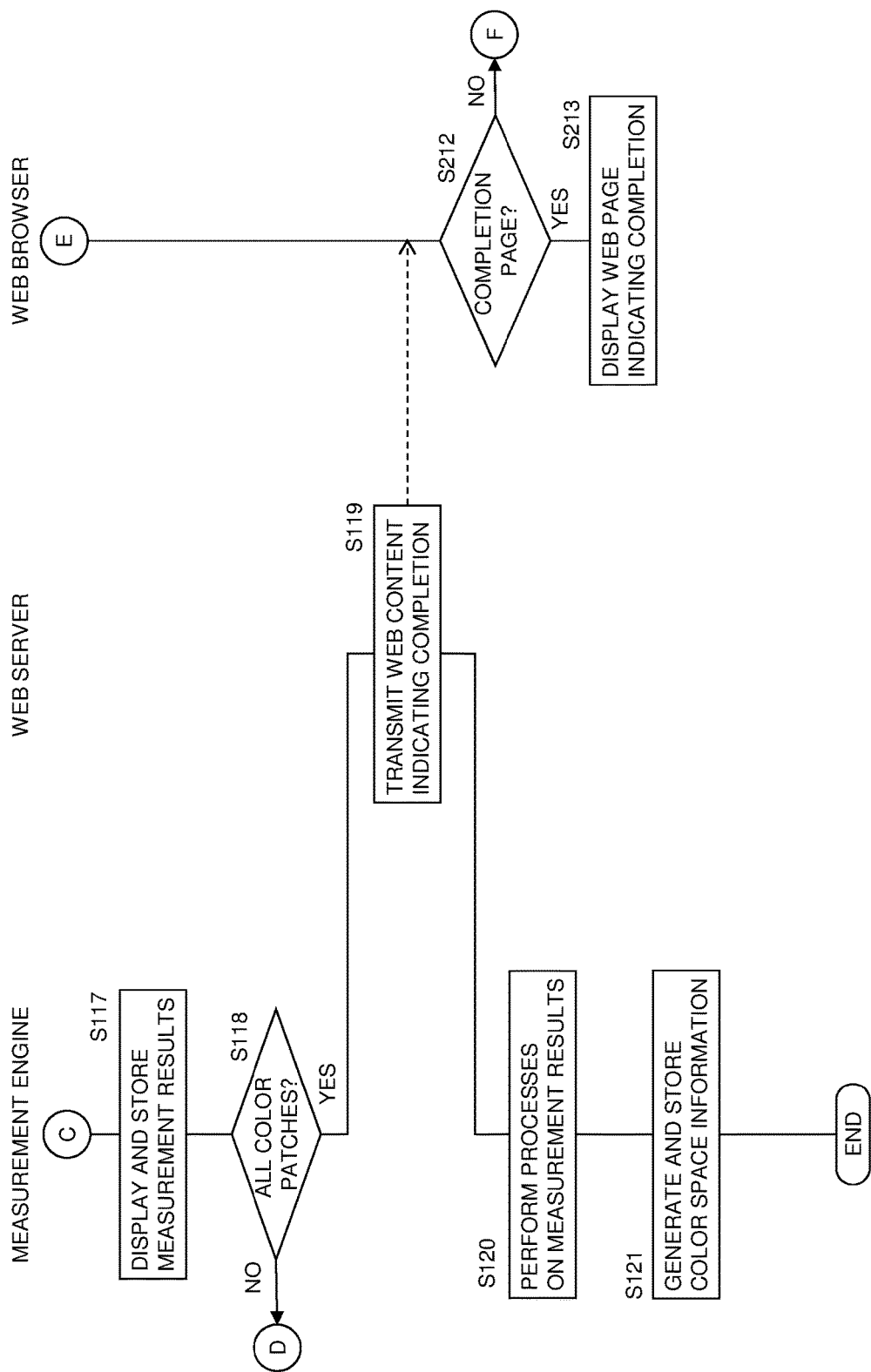
FIG. 6 is a flowchart showing one example of process steps performed by the measurement system of the first embodiment.

There will be described the steps of a measurement process that the measurement device 1 and the information terminal 3 perform through communication in the measurement system thus configured. FIGS. 4 to 6 are flowcharts showing one example of process steps performed by the measurement system of the first embodiment.

The control unit 10 of the measurement device 1 starts the measurement program 1P to start the measurement engine 101 and then instructs the measurement engine 101 to start the Web server 102 (step S101). Thus, the Web server 102 starts up (step S102).

Then, through the measurement engine 101, the control unit 10 instructs the Web server 102 to create Web content for preparing measurements (step S103). Thus, the Web server 102 creates Web content for preparing measurements (step S104). Instead of creating Web content, the control unit 10 may acquire Web content which is previously stored in the storage unit 11 or another device.

Then the control unit 10 makes, on the display unit 16 thereof, a display instructing the target information terminal 3 to start the Web browser 301 and to access the Web server 102 of the measurement device 1 through the Web browser 301 (step S105). Then the control unit 10 determines whether the Web server 102 has been accessed by the Web browser 301 of the information terminal 3 (step S106). When the control unit 10 determines that the Web server 102 has not been accessed by the Web browser 301 (S106: NO), it returns the process to step S106 and enters into standby mode.

On the information terminal 3 side, the operator performs an operation corresponding to the access instruction displayed on the display unit 16 of the measurement device 1. Thus, the control unit 30 starts the Web browser 301 (step S201). Specifically, since an icon or the like for accessing a Web page (UI) for preparing measurements is displayed on the display unit 32, the operator performs an operation such as a touch on the icon. Thus, the Web browser 301 starts up. Then, through the Web browser 301, the control unit 30 requests the Web server 102 to transmit Web content for preparing measurements (step S202).

When the control unit 10 of the measurement device 1 determines that the Web server 102 has been accessed by the Web browser 301 (S106: YES), it transmits the created Web content for preparing measurements (step S107). By using the measurement engine 101 (or Web server 102), the control unit 10 determines whether a measurement start operation has been performed on a UI for preparing measurements (step S108). When the control unit 10 determines that such an operation has not been performed (S108: NO), it returns the process to step S108 and waits until such an operation is performed.

Through the Web browser 301, the control unit 30 of the information terminal 3 receives the Web content for preparing measurements from the Web server 102 (step S203) and displays the UI for preparing measurements on the display unit 32 on the basis of the received Web content (step S204). The UI for preparing measurements includes a measurement start button. The operator can instruct the start of a measurement by touching on the measurement start button of the touchscreen of the display unit 32.

Alternatively, in step S204, the measurement start button may be displayed on the display unit 16 of the measurement device 1 and then measurements may be started by the operation of the measurement device 1.

The control unit 30 determines whether any operation has been performed on the UI for preparing measurements (step S205). When the control unit 30 determines that no operation has been performed (S205: NO), it returns the process to step S205. When the control unit 30 determines that an operation has been performed (S205: YES), it transmits information on the operation to the Web server 102 (step S206). The control unit 30 then requests the Web server 102 to transmit Web content for a color patch (step S207). When the operator touches on the measurement start button of the UI, the Web content for preparing measurements preferably includes display control information instructing the information terminal 3 to request Web content for a particular color patch. Specifically, the header of the current HyperText Markup Language (HTML) file preferably includes the name of the next HTML file. Alternatively, a request by the UI of the Web browser 301 to access a Web page for a particular color patch may be displayed on the display unit 16 of the measurement device 1 and then the operator may attempt access to the page requested.

When the control unit 10 detects that the Web server 102 has received the information on the operation and the content request transmitted by the Web browser 301 and thus determines that a measurement start operation has been performed on the UI for preparing measurements, it instructs the Web server 102 to create and transmit Web content for displaying a color patch in order to start a measurement (step S109).

Based on the instruction, the control unit 10 creates Web content for a color patch using the Web server 102 (step S110). For example, the control unit 10 creates an HTML file whose background color alone is specified, as Web content for a color patch. Alternatively, the control unit 10 may create HTML files corresponding to various color patches and store the HTML files in the storage unit 11 in advance and then retrieve them. Then the control unit 10 transmits the Web content along with display control information (to be discussed later) using the Web server 102 (step S111).

The display control information transmitted along with the Web content by the Web server 102 includes information for matching the timing when the Web browser 301 makes a display with the timing when the optical sensor 2 performs a measurement. Specifically, the display control information is information requesting reload of the Web browser 301 and conforms to the HTML 4.0 specification.

FIG. 7 is a drawing showing one example of the display control information of the first embodiment and shows Web content for displaying a color patch. In the example shown in FIG. 7, the Web content is a HTML file conforming to the HTML 4.0 specification, as described above. When the Web browser 301 receives the Web content shown in FIG. 7, an image for measuring the display light intensity of R (red)=255 is displayed on the display unit 32.

In the example shown in FIG. 7, information requesting reload (refresh) is included. Specifically, a META tag conforming to HTML 4.0 indicates "Refresh" and also indicates that the "Refresh" interval is "3." The HTML file itself shown in FIG. 7 is designated as Web content to be requested next and therefore reloaded. That is, based on the display control information shown in FIG. 7, the Web browser 301 reloads the HTML file "3" seconds later and requests an HTML file (Web content) represented by "URL= . . . " In the example of FIG. 7, the name of the Web content to be requested includes information indicating that (R, G, B) of a color patch to be displayed is (255, 0, 0). As seen above, in the display control information of the first embodiment, the name itself of the Web content (HTML file) transmitted by the Web server 102 includes information identifying the patch ("Patch(255.000.000).html").

Referring back to the flowcharts of FIGS. 4 to 6, the control unit 30 of the information terminal device 3 receives Web content as shown in FIG. 7 through the Web browser 301 (step S208) and displays a color patch based on the received Web content (step S209).

At this time, it may be preferred to disable the color space conversion function of the Web browser 301. This is because some types of the existing Web browsers have a function of automatically converting color space in accordance with the content. Depending on the purpose of the measurement, it is preferable that the color space conversion function be disabled. Accordingly, this function may be disabled when displaying a color patch. Note that the disabling instruction may be transmitted by the measurement device 1 along with the Web content for preparing measurements or along with the Web content for a color patch.

In the measurement device 1, the control unit 10 identifies a color patch being displayed using the measurement engine 101 (step S112). Specifically, the control unit 10 acquires color information identifying a color patch from the file name of the requested content. The content request that the information terminal 3 has made on the basis of the display control information shown in FIG. 7 includes "Patch (255.000.000).html." Accordingly, the control unit 10 identifies the color patch being displayed as a color patch of (R, G, B)=(255, 0, 0). The control unit 10 then determines whether the identified color patch is a color patch whose light intensity is to be measured (step S113). When the control unit 10 determines that the color patch is not a color patch to be measured, using the measurement engine 101 (S113: NO), the control unit 10 returns the process to step S112 and waits until a display is made based on the Web content for a color patch which the control unit 10 is supposed to have transmitted.

When the control unit 10 of the measurement device 1 determines that the color patch is a color patch to be measured (S113: YES), it controls the optical sensor 2 to perform a measurement (step S114). Note that the measurement is preferably performed after a wait of, e.g., about one second. This is because it is preferred to perform a measurement after a Web page based on the transmitted Web content, that is, a color patch is displayed and then stabilized.

During this period, the Web browser 301 of the information terminal 3 transmits a content request on the basis of the display control information, for example, every three seconds. The control unit 10 then determines whether the measurement is complete, using the measurement engine 101 (step S115). When the control unit 10 determines that the measurement is not complete (S115: NO), it transmits Web content for the current color patch (step S116). The control unit 10 then returns the process to step S115 and waits until the measurement is complete. When the control unit 10 determines that the measurement is complete (S115: YES), the process proceeds to step S117.

During this period, based on the display control information, the control unit 30 requests the measurement device 1 to transmit the next Web content (HTML file) (step S210). That is, the control unit 30 reloads the Web browser 301. The control unit 30 then receives Web content transmitted in response to the content request (step S211). The control unit 30 determines whether the received Web content is a page indicating that the measurements are complete (step S212). When the control unit 30 determines that the Web content is a not a page indicating that the measurements are complete (S212: NO), that is, when the control unit 30 is still receiving Web content for a color patch, it returns the process to step S209 and repeatedly displays a color patch based on the received Web content and reloads the Web browser 301. Note that the determination process in step S212 need not necessarily be performed. This is because if the Web page indicating that the measurements are complete does not include display control information requesting reload as shown in FIG. 7, the control unit 30 does not proceed to step S210, that is, does not reload the Web browser 301.

Through the above process, the measurement device 1 can match the timing when the measurement is complete and the timing when the measurement device 1 transmits Web content for the next color patch. Further, assuming that a measurement performed by the optical sensor 2 takes "5" seconds, if the interval at which the Web browser 301 is reloaded is set to as short as "3" seconds, as shown in the above example, it is possible to efficiently change a color patch 34 to be displayed and thus to reduce the time required to measure all color patches. Note that the reload interval is not limited to that described above and may be set to a longer time than the time taken by a measurement so as to suppress flicker on the screen. That is, the reload interval only has to be set to a time such that the display is controlled at an appropriate timing.

When the control unit 10 determines that the measurement is complete, using the measurement engine 101 (S115: YES), it displays the measurement result on the display unit 16 and stores it in the storage unit 11 in such a manner that the measurement result is associated with information on the color patch identified in step S112 (step S117).

Alternatively, in step S115, the control unit 10 may compare the measurement result with that on the preceding color patch and then determine that the measurement is complete. Specifically, the control unit 10 compares the measurement result with the preceding one, determines whether there is a color difference, actually confirms that the color patch on the display unit 32 of the information terminal 3 has been changed, and then determines that the measurement is complete. Note that the measurement device 1 does not necessarily need to perform step S177. For example, the control unit 10 of the measurement device 1 may only output the measurement result to another information processing device (not shown) using the measurement engine 101.

Then the control unit 10 determines whether measurements on all color patches to be measured are complete (step S118). When the control unit 10 determines that measurements on all color patches are not complete (S118: NO), the control unit 10 returns the process to step S109 and sequentially creates and transmits Web content for the remaining color patches (S109 to S111) and performs corresponding measurements (S112 to S115). For example, assuming that the example HTML file shown in FIG. 7 has been transmitted and that measurements are being performed based on the example HTML file, the Web server 102 changes the HTML file name in the META tag, which requests reload, from "Patch(255.000.000).html" to, for example, "Patch (254.000.000).html" and causes the Web browser 301 to request Web content for another color patch and to display the corresponding Web page.

When the control unit 10 determines that measurements on all color patches are complete (S118: YES), it transmits Web content indicating the completion from the Web server 102 (step S119). The Web content transmitted from the Web server 102 does not need to include display control information requesting reload. This stops the reload of the Web browser 301.

When the control unit 30 of the information terminal 3 determines that the received Web content is a Web page indicating that the measurements are complete (S212: YES), it displays, on the display unit 32, a Web page indicating the completion based on the received Web content (step S213).

After transmitting the Web content indicating the completion, the control unit 10 of the measurement device 1 performs appropriate processes on the measurement results (step S120), generates color space information on the basis of the resulting measurement results, and stores the color space information in the storage unit 11 (step S121), ending the process.

Examples of the appropriate processes in step S120 include classification of the color patches by color. The control unit 10 may sort out the measurement results. The color space information in step S121 refers to, for example, a file indicating an adjustment goal for emulation, or ICC profile. For example, the color space information is information for performing conversion such that when the display unit 32 of the information terminal 3 is instructed to display a color (red) of 8-bit RGB (255, 0, 0), 10-bit RGB space is represented not with RGB (1023, 0, 0) but with RGB (1001, 0, 0) on another display device so that the color actually displayed on the display unit 32 is reproduced. In this case, color space information for performing conversion on the display unit 32 may be generated as a 3D-LUT where R, G, and B are used as dimensions.

Note that the measurement device 1 does not necessarily need to perform steps S121 and S122. Another information processing device may perform appropriate processes on the results obtained by the measurement device 1 and then generates and stores color space information.

The UI for preparing measurements displayed on the display unit 32 of the information terminal 3 in step S204 may be displayed on the display unit 16 of the measurement device 1. The UI for preparing measurements may also be an UI in which the operator can make settings related to measurements. For example, the UI for preparing measurements may be a UI which receives a selection on the type of the information terminal 3, the type of the display unit 32, or the like. The UI for preparing measurements may also be a UI which receives a selection on whether the measurement device 1 only performs measurements, or performs measurements and then generates an ICC profile. The UI for preparing measurements may also be a UI which receives a selection on the type of an ICC profile to be generated. As used herein, the type of an ICC profile includes whether the ICC profile is a 3D-LUT.

According to the above configuration, color patches for measurement serving as Web content are transmitted to the Web browser 301 of the information terminal 3 and displayed. Further, under the control of the control unit 10 of the measurement device 1, the timing when the Web browser 301 displays a color patch is matched with the timing when a measurement is performed. Accordingly, even the information terminal 3 having no input/output terminal can perform color management by measuring color patches, as long as the information terminal 3 can run the Web browser 301.

Further, the functions of the measurement engine 101 are basically similar to the traditional steps where color patches are displayed and measured on the target device to be measured (e.g., display unit 16) through the video input/output terminal of the device. The measurement engine 101 can perform processes in any of the case where color patches are displayed on the target device through the Web server 102 and the case where color patches are displayed thereon through a video input/output terminal. Accordingly, there is also obtained a significant advantage that software resources for measurements which have been traditionally used can be used.

In another example of display control information, the measurement device 1 may request reload of the Web browser 301, handle a content request as the same HTML file all the time, and change only the contents of the Web content. FIG. 8 is a drawing showing another example of display control information of the first embodiment. An upper part of FIG. 8 shows Web content which has yet to be changed by the control unit 10 of the measurement device 1, whereas a lower part of FIG. 8 shows Web content which has been changed thereby. When the Web browser 301 receives the Web content shown in the upper part of FIG. 8, an image of R (red)=255 for measuring the display light intensity is displayed on the display unit 32. When the Web browser 301 receives the Web content shown in the lower part of FIG. 8, an image of G (green)=255 for measuring the display light intensity is displayed on the display unit 32.

In an example of display control information shown in FIG. 8, the META tag indicates "Refresh" to request reload and also indicates that the "Refresh" interval is "5." That is, based on this display control information, the Web browser 301 performs reload "5" seconds later and simply requests the same HTML file. After the measurement, the control unit 10 of the measurement device 1 changes only the contents of the Web content, as shown in the lower part of FIG. 8. Thus, while the Web browser 301 simply repeats reload all the time, the measurement device 1 can control details displayed on the display unit 32.

In this case, the control unit 10 of the measurement device 1 cannot identify the transmitted content using a content request from the Web browser 301. Accordingly, the control unit 10 needs to perform processes such as a process of searching texts in a Web page being transmitted by the Web server 102 and acquiring information identifying a color patch in the BODY tag.

The examples shown in FIGS. 7 and 8 are examples where Web content is created using a HTML file. Web content created by the Web server 102 is not limited to an HTML file and may be content created using Adobe Flash® (a product of Adobe Systems).

Second Embodiment

In the first embodiment, measurements are performed on the single information terminal 3; the measurement results are stored; and color space information for the information terminal 3 is generated when necessary. In a second embodiment, on the other hand, measurements are performed on multiple information terminals 3; the measurement results are averaged; and color space information which applies to the multiple information terminals 3 is generated.

Assuming that a measurement is performed on each information terminal 3, the configuration of a measurement system of the second embodiment is similar to that of the first embodiment. The only difference between both configurations is details of the process steps performed by the control unit 10 of the measurement device 1. Accordingly, for the hardware configuration, the components are given the same numerals and will not be described in detail. The process steps will be described below.

Figure 9:
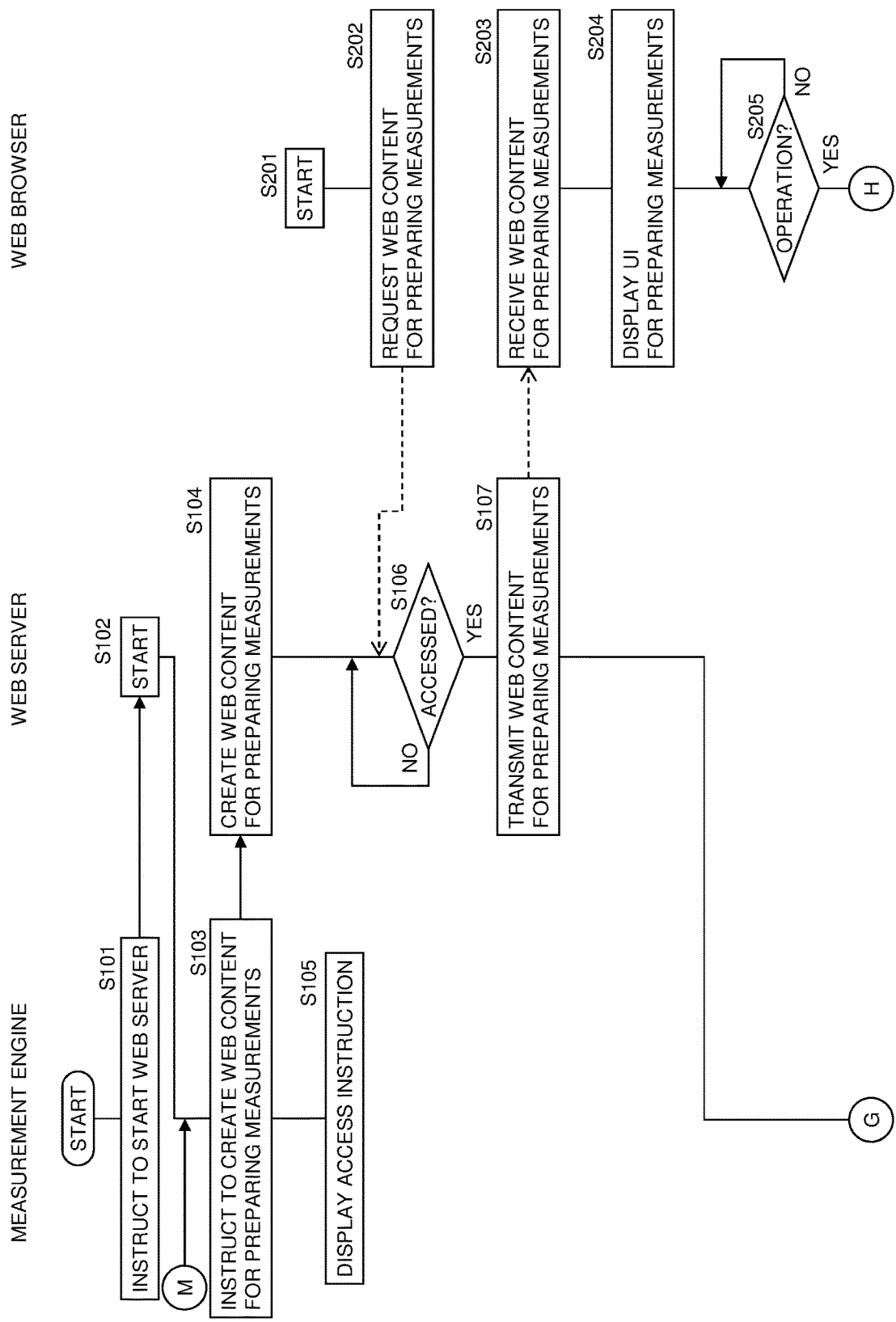
FIG. 9 is a flowchart showing one example of process steps performed by a measurement system of a second embodiment.
Figure 10:
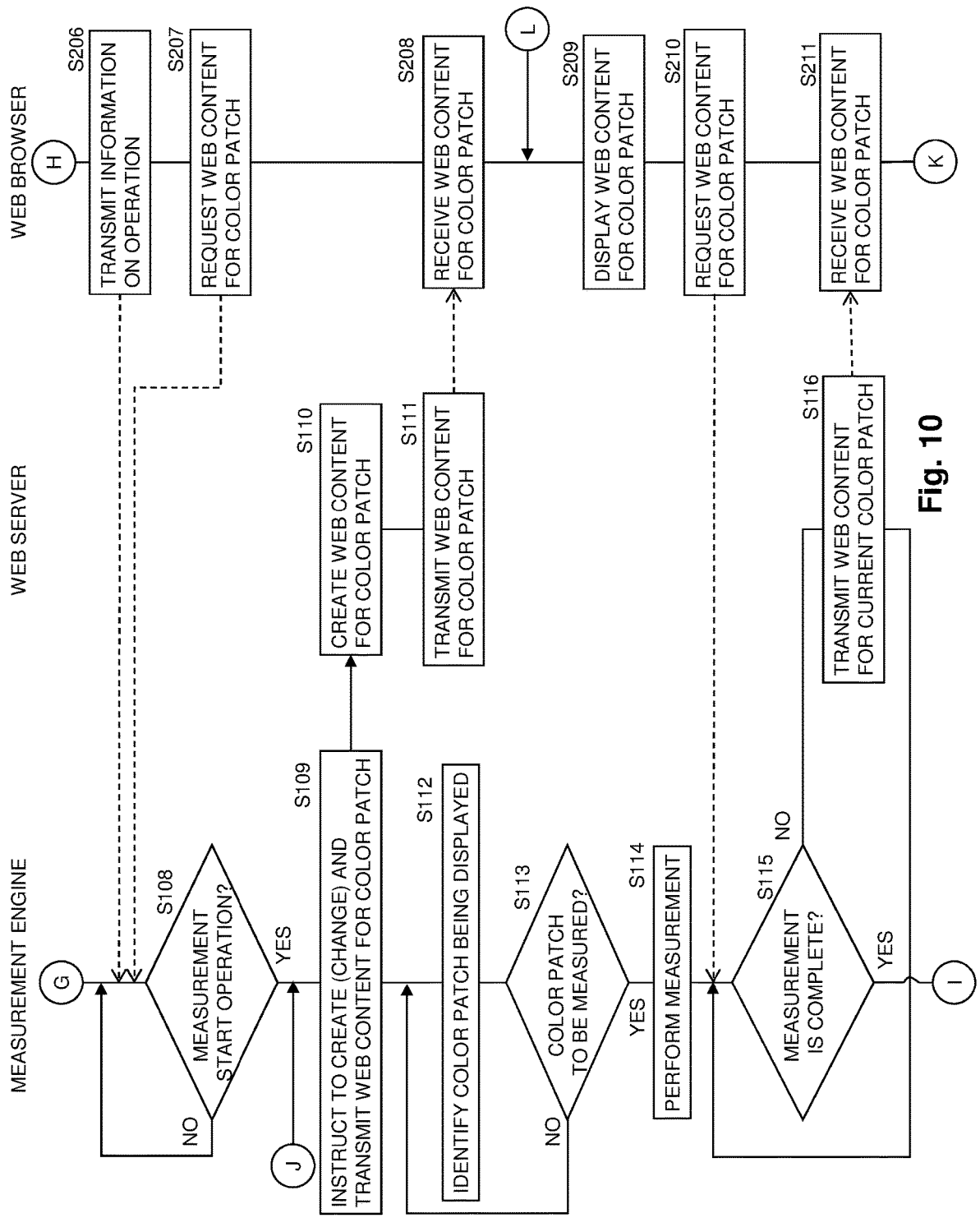
FIG. 10 is a flowchart showing one example of process steps performed by the measurement system of the second embodiment.
Figure 11:
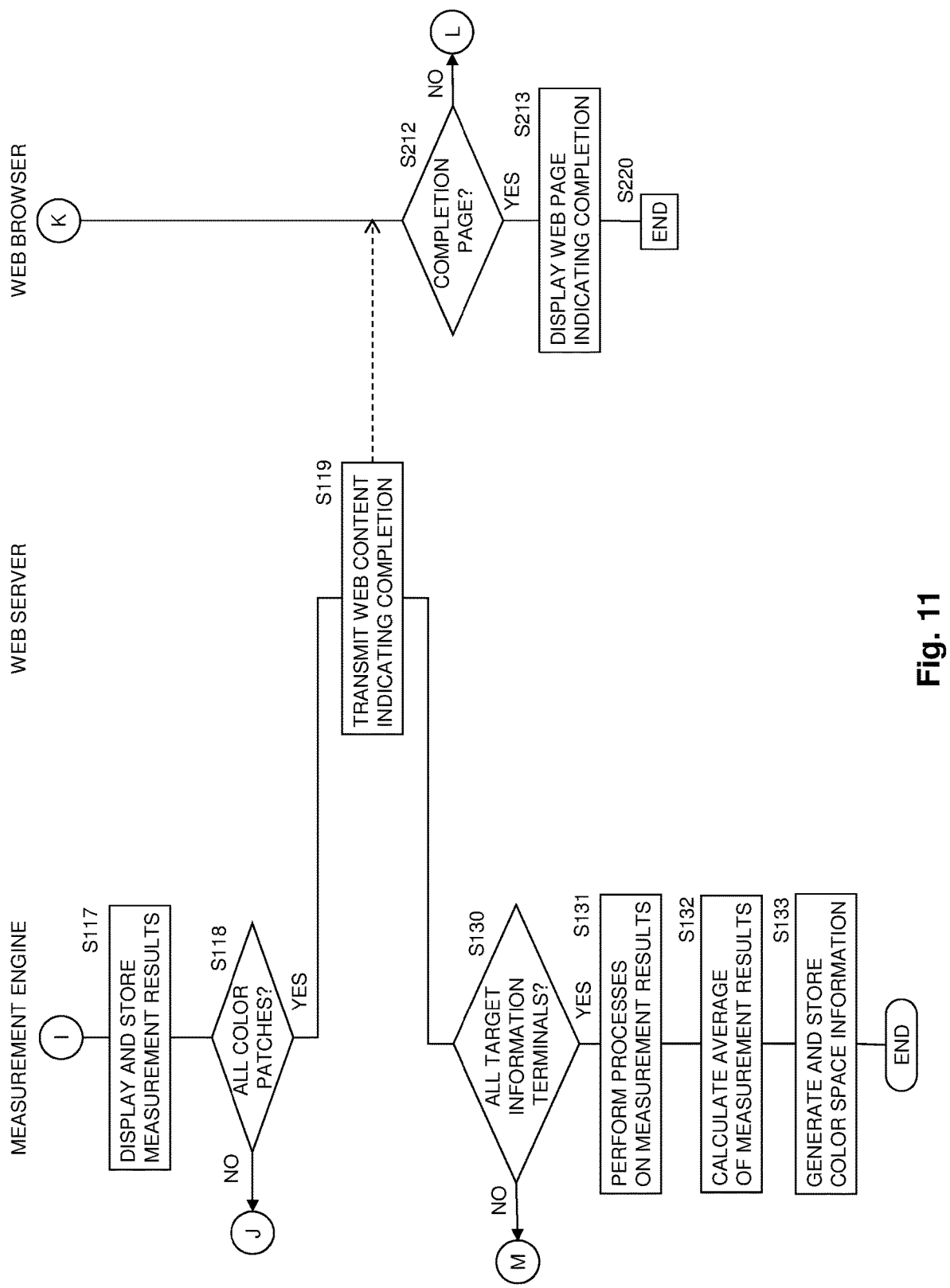
FIG. 11 is a flowchart showing one example of process steps performed by the measurement system of the second embodiment.

FIGS. 9 to 11 are flowcharts showing one example of process steps performed by the measurement system of the second embodiment. Of the process steps shown below, process steps which are shared by the measurement system of the first embodiment are given the same step numbers and will not be described in detail.

The control unit 10 of the measurement device 1 starts the measurement program 1P to start the Web server 102 and performs a measurement on the first information terminal 3 (steps S103 to S119).

The first information terminal 3 starts the Web browser 301 on the basis of an access instruction displayed on the display unit 16 of the measurement device 1 (S201), requests Web content for preparing measurements (S202), and then automatically displays a color patch 34 on the display unit 32 on the basis of Web content and display control information transmitted from the Web server 102 of the measurement device 1 in accordance with a measurement process (S203 to S213). When a Web page indicating the completion is displayed on the first information terminal 3, the Web browser 301 ends (step S220). Specifically, the operator ends the Web browser 301 by performing an ending operation on the UI of the Web browser 301. Thus, the measurement on the first information terminal 3 is complete.

After completing the measurement on the first information terminal 3 (S119), the control unit 10 of the measurement device 1 determines whether measurements on all target information terminals are complete (step S130). Specifically, the control unit 10 makes a display for causing the operator to make a selection on whether to complete measurements and, when the operator selects the completion, determines that measurements are complete.

When the control unit 10 determines in step S130 that measurements on all target information terminals are not complete (S130: NO), it returns the process to step S103 and performs measurements on the second and other information terminals 3 (S103 to S119).

When the control unit 10 of the measurement device 1 determines in step S130 that measurements on all target information terminals are complete (S130: YES), it performs appropriate processes on the measurement results of the multiple target information terminals 3 (step S131). Examples of the appropriate processes include classification of the color patches by color and sort-out of the measurement results, for example, elimination of peculiar measurement results. If the measurement result on a particular information terminal 3 of all the target information terminals 3 is peculiar, the peculiar measurement result may be eliminated from measurement results to be subjected to subsequent processes.

After performing the above processes on the measurement results (S131), the control unit 10 of the measurement device 1 calculates the average of the resulting measurement results (step S132). Based on the average calculated in step S132, the control unit 10 generates color space information which equally applies to the target multiple information terminals 3 and stores the color space information in the storage unit 11 (step S133), ending the process.

Note that the measurement device 1 does not necessarily need to perform step S133. Another information processing device may generate and store color space information using the results obtained by the measurement device 1.

The above process is useful, for example, when characteristics of the display unit 32 have some tendency depending on the manufacturing lot of the information terminal 3. By extracting some of information terminals 3 of the same manufacturing lot, performing measurements on the extracted information terminals 3, and averaging the measurement results, the number of processes can be reduced compared to that in the case where measurements are performed on all the information terminal 3 and then color space information is generated for each information terminal 3. Further, color space information which absorbs characteristics of each information terminal 3 to some extent can be obtained.

Preferably, the measurement device 1 is configured to be capable of making settings on whether the control unit 10 of the measurement device 1 performs the process of FIGS. 4 to 6 of the first embodiment or performs the process of FIGS. 9 to 11. Specifically, when the control unit 10 starts the measurement program 1P, it displays an UI requesting the selection of the type of measurement on the display unit 16 and then determines subsequent processes on the basis of the type selected by the operator and performs the processes. The types of measurement include: a measurement is performed on a single information terminal 3 and then color space information is generated and stored (FIGS. 4 to 6); and measurements are performed on multiple information terminals 3 and then pieces of color space information corresponding to the multiple information terminals 3 are generated and stored (FIGS. 9 to 11). The measurement device 1 may be configured so that the operator can make a selection on whether to generate color space information or only perform measurements. The measurement device 1 may also be configured so that the operator can make a selection on whether color space information to be generated is an ICC profile, another type of adjustment file, 3D-LUT, or others.

In the measurement system of the first and second embodiments, the measurement device 1 and the information terminal 3 communicate with each other in accordance with HTML 4.0. However, the communication method is not limited to the that shown in the first and second embodiments and may be socket communication according to JSP (Java® Server Pages) or Adobe Flash®, which allow mutual communication, or communication according to the Web-socket standard of HTML 5. In this case, when the measurement engine 101 ends the measurement process, it is possible to perform control so that the measurement engine 101 transmits Web content for the next color patch and then the information terminal 3 receives it, without causing the information terminal 3 to make a content request based on intermittent reload.

Third Embodiment

While the measurement device 1 has both of measurement engine and Web server functions in the first and second embodiments, another information processing device has a Web server function in a third embodiment.

The configuration of a measurement system of the third embodiment is similar to that of the first embodiment except that another information processing device has some of the functions of the measurement device 1 of the first embodiment. Accordingly, in the third embodiment below, components shared by the first embodiment are given the same numerals and will not be described in detail.

Figure 12:
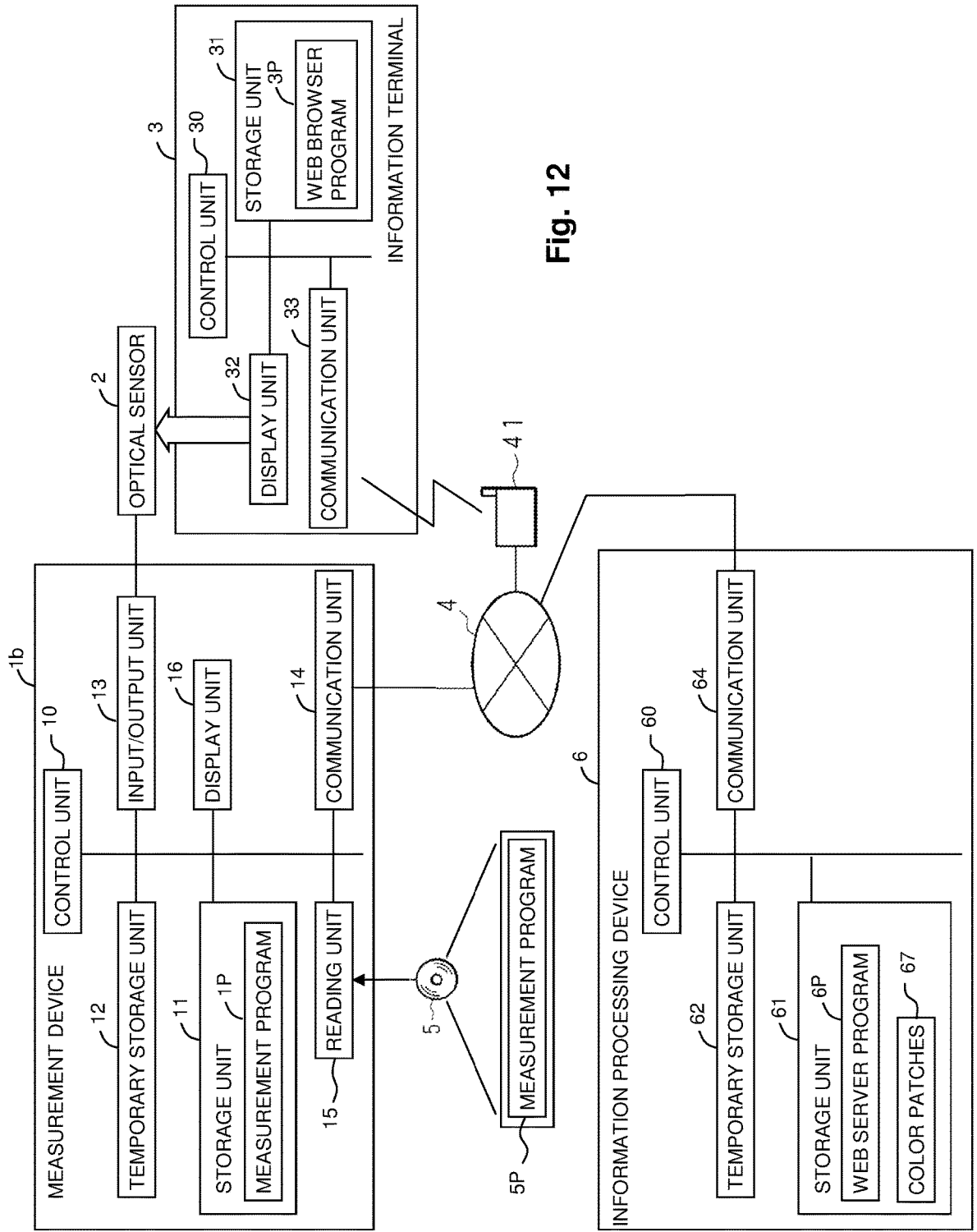
FIG. 12 is a block diagram showing the configuration of a measurement system of a third embodiment.

FIG. 12 is a block diagram showing the configuration of the measurement system of the third embodiment. In the third embodiment, the measurement system includes a measurement device 1b, an optical sensor 2, and a target information terminal 3 to be measured, and an information processing device 6.

The measurement device 1b is, for example, a PC and includes a control unit 10, a storage unit 11, a temporary storage unit 12, an input/output unit 13, a communication unit 14, a reading unit 15, and a display unit 16. The storage unit 11 of the measurement device 1b stores a measurement program 1P but does not store a Web server program or color patches. The control unit 10 of the measurement device 1b causes the PC to function as a measurement device 1b for performing the processing of the measurement engine by loading the measurement program 1P into the temporary storage unit 12 and then executing the program.

The information processing device 6 is, for example, a PC and includes a control unit 60, a storage unit 61, a temporary storage unit 62, and a communication unit 64.

The control unit 60 is, for example, a CPU and controls the respective units. The control unit 60 also causes the PC to function as a Web server by loading a measurement program 6P stored in the storage unit 61 into the temporary storage unit 62 and then executing the program. The storage unit 61 is, for example, a hard disk and may be various types of non-volatile memories, such as an SSD. The storage unit 61 stores the Web server program 6P, as well as color patches 67. The storage unit 61 may previously store Web content which is to be transmitted to the information terminal 3 when the storage unit 61 functions as a Web server. The temporary storage unit 62 is, for example, a RAM such as an SRAM or DRAM.

The communication unit 64 is, for example, a LAN interface. The communication unit 64 is connected to a network 4. The communication unit 64 transmits or receives information through the network 4 in accordance with a predetermined communication protocol. While the communication unit 64 and the communication unit 14 of the measurement device 1b communicate with each other in accordance with the HTML, another communication protocol may be used. The control unit 60 receives an instruction from the measurement device 1b or transmits Web content to the information terminal 3 through the communication unit 64.

The functions of the measurement system of the third embodiment are similar to those of the first embodiment. The third embodiment differs from the first embodiment in that the functions of the Web server 102 in the first embodiment shown in FIG. 3 are performed not by the measurement device 1 but by the information processing device 6 and that the Web server 102 performed by the information processing device 6 receives an instruction, such as switching of the color patch being displayed, from the measurement engine 101 performed by the measurement device 1b through the network 4.

Accordingly, the steps of the measurement process of the third embodiment are similar to those of the first embodiment shown in FIGS. 4 to 6. As described above, the difference is that the measurement engine 101 and the Web server 102 transmit or receive instructions to or from each other not in the measurement device 1 but through the network 4. Specifically, the start instruction in step S101 and the Web content creation instruction in step S103 shown in FIG. 4 are transmitted to the Web server function performed by the information processing device 6 through the communication unit 14 and the network 4. Similarly, the creation/transmission instruction of Web content for a color patch in step S109 and the content transmission request in the case of determination of NO in step S115 shown in FIG. 5 are transmitted from the function of the measurement engine 101 to the Web server function performed by the information processing device 6 through the communication unit 14 and the network 4. Similarly, the Web content transmission instruction indicating the completion in the case of determination of YES in step S118 shown in FIG. 6 is transmitted from the function of the measurement engine 101 to the Web server function performed by the information processing device 6 through the communication unit 14 and the network 4.

In the third embodiment, the Web server function is separated from the measurement device 1b and thus it is possible to perform measurements on multiple information terminals 3 in parallel. Specifically, in step S115, none of the control unit 10 and the control unit 60 determines that the measurements are complete, unless measurements on all the multiple target information terminals 3 are complete. For this reason, in step S109, switching to Web content for another color patch is not requested, unless measurements on all the target information terminals 3 are complete. Alternatively, the measurement engine 101 and the Web server 102 may be performed as follows: pieces of Web content for a color patch are associated with pieces of information identifying the multiple target information terminals 3 and then distinguished from each other; and the functions of the measurement engine 101 and the Web server 102 are performed in an asynchronous and parallel manner. Specifically, the HTML file name (e.g., "Patch(255.000.000).html") corresponding to Web content for a color patch may vary among the multiple target information terminals 3 (e.g., "001# Patch(255.000.000).html"; the initial "001" is information identifying the information terminal 3). Thus, it is possible to perform measurements on the multiple information terminals 3 in parallel to significantly reduce the time required for measurements.

The file for adjustment or ICC profile created in the first to third embodiments can be used, for example, as reference data for emulating the display color on the target display device (information terminal 3). To perform emulation, an application having an emulation function, such as Photoshop® (a trade name of Adobe Systems), or an application for color management available from a display device manufacturer, such as ColorNavigator (a trade name of EIZO Corporation), may be used.

The embodiments disclosed herein should be construed as being illustrative and not limiting in all respects. The scope of the present invention is shown not by the above-mentioned description but by the claims and includes all changes without departing from the claims and meanings equivalent thereto.

DESCRIPTION OF NUMERALS

1: measurement device
10: control unit
101: measurement engine
102: Web server
11: storage unit
1P measurement program
13: input/output unit
14: communication unit
2: optical sensor
3: information terminal
30: control unit
301: Web browser
32: display unit
33: communication unit

The invention claimed is:
1. A measurement method using a measurement system, wherein
the measurement system comprises
a measurement device connected to an optical sensor; and a tablet information terminal independent from the measurement device and configured to communicate with the measurement device via a network communication, and optionally comprises an information processing device configured to communicate with the measurement device via the network communication, wherein the measurement device is connected to the optical sensor without passing through the tablet information terminal, a measurement engine is on operation in the measurement device, a Web server is on operation in the measurement device or the information processing device, and a Web browser is on operation in the information terminal, and the method comprises the steps of:

in response to a content request by the Web browser, transmitting, by the Web server and via the network communication, to the information terminal, content comprising an image for adjustment and display control information, the display control information including next image identification information to identify an image for adjustment to be displayed next and interval information which indicates content request interval set in accordance with measurement timing of the optical sensor;

each time the information terminal receives the content, displaying, by the Web browser, the image for adjustment included in the content on a display unit of the information terminal;

measuring, by the measurement engine, light intensity of the display unit displaying the image for adjustment using the optical sensor and inputting the measured light intensity to the measurement device; and transmitting, by the Web browser, a next content request to the Web server every time the content request interval passes; and when the Web server receives the next content request and after the measurement is completed and the measured light intensity is input into the measurement device, causing, by the measurement engine, the Web server to change the content to be transmitted into that including an image for adjustment to be displayed next, in accordance with the next image identification information.

2. The measurement method of claim 1, wherein the display control information includes current image identification information identifying the image for adjustment included in the content.

3. The measurement method of claim 2, further comprising a step of storing the current image identification information and a measurement result obtained in the step of measuring in such a manner that the current image identification information and the measurement result are associated with each other.

4. The measurement method of claim 1, wherein the display control information includes intermittent transmission information instructing the Web browser to intermittently transmit the content request, and the Web browser intermittently transmits the content request in accordance with the intermittent transmission information.

5. The measurement method of claim 1, wherein the Web server is on operation in the measurement device.

6. The measurement method of claim 1, wherein the Web server is on operation in the information processing device.

7. The measurement method of claim 1, further comprising a step of generating color space information related to conversion of color space of the information terminal on the basis of a measurement result obtained in the step of measuring.

8. A non-transitory storage medium storing a computer program for causing a computer to execute the measurement method of claim 1.

9. A measurement system comprising:

a measurement device connected to an optical sensor; and a tablet information terminal independent from the measurement device and configured to communicate with the measurement device via a network communication, and optionally comprising an information processing device configured to communicate with the measurement device via the network communication, wherein the measurement device is connected to the optical sensor without passing through the tablet information terminal, a measurement engine is on operation in the measurement device, a Web server is on operation in the measurement device or the information processing device, and a Web browser is on operation in the information terminal, and the Web server is so configured to, in response to a content request by the Web browser, transmit, via the network communication, to the information terminal, content comprising an image for adjustment and display control information, the display control information including next image identification information to identify an image for adjustment to be displayed next and interval information which indicates content request interval set in accordance with measurement timing of the optical sensor;

the Web browser is so configured to, each time the information terminal receives the content, display the image for adjustment included in the content on a display unit of the information terminal;

the measurement engine is so configured to measure the light intensity of the display unit displaying the image for adjustment using the optical sensor and inputting the measured light intensity to the measurement device; and the Web browser is so configured to transmit a next content request to the Web server every time the content request interval passes; and the measurement engine is so configured to, when the Web server receives the next content request and after the measurement is completed and the measured light intensity is input into the measurement device, cause the Web server to change the content to be transmitted into that including an image for adjustment to be displayed next, in accordance with the next image identification information.

* * * * *